(12) United States Patent
Gellert et al.

(10) Patent No.: US 7,413,432 B2
(45) Date of Patent: *Aug. 19, 2008

(54) COMPACT CARTRIDGE HOT RUNNER NOZZLE

(75) Inventors: Jobst U. Gellert, Oakville (CA); Denis Babin, Georgetown (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/681,593

(22) Filed: Mar. 2, 2007

(65) Prior Publication Data

US 2007/0148279 A1    Jun. 28, 2007

Related U.S. Application Data

(60) Division of application No. 11/510,994, filed on Aug. 28, 2006, which is a continuation of application No. 10/601,190, filed on Jun. 23, 2003, now Pat. No. 7,108,502, which is a division of application No. 10/025,767, filed on Dec. 26, 2001, now Pat. No. 6,638,053, which is a continuation of application No. 09/520,843, filed on Mar. 8, 2000, now Pat. No. 6,394,784.

(51) Int. Cl.
*B29C 45/20* (2006.01)

(52) U.S. Cl. ............................................ 425/549

(58) Field of Classification Search ............... 425/549; 264/328.15
See application file for complete search history.

(56) References Cited

U.S. PATENT DOCUMENTS

| | | | |
|---|---|---|---|
| 2,088,586 A | 8/1937 | Cole et al. | |
| 2,378,530 A | 6/1945 | Bailie et al. | |
| 2,522,365 A | 9/1950 | Greene | |
| 2,769,201 A | 11/1956 | Lorenian | |
| 2,794,504 A | 6/1957 | Carpenter | |
| 2,814,070 A | 11/1957 | Bulkley et al. | |
| 2,875,312 A | 2/1959 | Norton | |

(Continued)

FOREIGN PATENT DOCUMENTS

DE    3324901 A1    1/1985

(Continued)

OTHER PUBLICATIONS

Husky, "1250 Series Hot Runner Manual; Operation and Maintenance," (Mar. 2001), p. 52, 55-57.

(Continued)

*Primary Examiner*—Tim Heitbrink
(74) *Attorney, Agent, or Firm*—Medler Ferro PLLC

(57) ABSTRACT

The present invention provides an electrically heated nozzle for injection molding which is insulated to prevent conduction of electricity and loss of thermal transmission to the casing, wherein at least a part of the electrical insulation comprises a layer of dielectric insulator material with an electrical resistance wire wound spirally thereabout and another dielectric insulator layer thereover. Also disclosed is a method for making such a nozzle which includes the steps of applying a first insulator layer, winding electrical resistance wire about the first insulator layer, applying a second insulator layer, and applying a casing layer thereover. The first and second insulating layers may be provided by spraying or through telescoping, self-supporting sleeves.

23 Claims, 10 Drawing Sheets

U.S. PATENT DOCUMENTS

| | | | |
|---|---|---|---|
| 2,987,300 A | 6/1961 | Greene |
| 2,991,423 A | 7/1961 | Vackar |
| 3,062,940 A | 11/1962 | Bauer et al. |
| 3,550,267 A | 12/1970 | Williams |
| 3,553,788 A | 1/1971 | Putkowski |
| 3,677,682 A | 7/1972 | Putkowski |
| 3,800,027 A | 3/1974 | Tsutsumi |
| 3,812,323 A | 5/1974 | Pink |
| 3,831,004 A | 8/1974 | Wallstrom |
| 3,849,630 A | 11/1974 | Halliday |
| 3,911,251 A | 10/1975 | Day |
| 3,912,907 A | 10/1975 | Lodi |
| 3,970,821 A | 7/1976 | Crandell |
| 4,032,046 A | 6/1977 | Elliott et al. |
| 4,120,086 A | 10/1978 | Crandell |
| 4,238,671 A | 12/1980 | Gellert |
| 4,304,544 A | 12/1981 | Crandell |
| 4,373,132 A | 2/1983 | Vartanian |
| 4,376,244 A | 3/1983 | Gellert |
| 4,386,262 A | 5/1983 | Gellert |
| 4,403,405 A | 9/1983 | Gellert |
| 4,438,064 A | 3/1984 | Tsutsumi |
| 4,438,322 A | 3/1984 | Sylvia |
| 4,485,387 A | 11/1984 | Drumheller |
| 4,492,556 A | 1/1985 | Crandell |
| 4,501,550 A | 2/1985 | Nikkuni |
| 4,516,927 A | 5/1985 | Yoshida |
| 4,557,685 A | 12/1985 | Gellert |
| 4,583,284 A | 4/1986 | Gellert |
| 4,588,367 A | 5/1986 | Schad |
| 4,621,251 A | 11/1986 | Keefe |
| 4,635,851 A | 1/1987 | Zecman |
| 4,641,423 A | 2/1987 | Crandell |
| 4,643,664 A | 2/1987 | Yoshida |
| 4,644,140 A | 2/1987 | Hillinger |
| 4,652,230 A | 3/1987 | Osuna-Diaz |
| 4,704,516 A | 11/1987 | Tsutsumi |
| 4,711,625 A | 12/1987 | Knauer et al. |
| 4,740,674 A | 4/1988 | Tsutsumi |
| 4,768,283 A | 9/1988 | Gellert |
| 4,771,164 A | 9/1988 | Gellert |
| 4,795,126 A | 1/1989 | Crandell |
| 4,837,925 A | 6/1989 | Gellert |
| 4,865,535 A | 9/1989 | Gellert |
| 4,882,469 A | 11/1989 | Trakas |
| 4,894,197 A | 1/1990 | Tsutsumi |
| 4,911,636 A | 3/1990 | Gellert |
| 4,945,630 A | 8/1990 | Gellert |
| 4,981,431 A | 1/1991 | Schmidt |
| 4,988,848 A | 1/1991 | Trakas |
| 5,051,086 A | 9/1991 | Gellert |
| 5,055,028 A | 10/1991 | Trakas |
| 5,136,141 A | 8/1992 | Trakas |
| 5,136,143 A | 8/1992 | Kutner et al. |
| 5,147,663 A | 9/1992 | Trakas |
| 5,225,211 A | 7/1993 | Imaida et al. |
| 5,226,596 A | 7/1993 | Okamura |
| 5,235,737 A | 8/1993 | Gellert |
| 5,266,023 A | 11/1993 | Renwick |
| 5,282,735 A | 2/1994 | Gellert |
| 5,326,251 A | 7/1994 | Gellert |
| 5,360,333 A | 11/1994 | Schmidt |
| 5,411,393 A | 5/1995 | Askin et al. |
| 5,456,592 A | 10/1995 | Shindo |
| 5,504,304 A | 4/1996 | Noguchi et al. |
| 5,527,177 A | 6/1996 | Potter |
| 5,614,233 A | 3/1997 | Gellert |
| 5,704,113 A | 1/1998 | Mak |
| 5,820,900 A | 10/1998 | McGrevy |
| 5,871,786 A | 2/1999 | Hume et al. |
| 5,955,120 A | 9/1999 | Deissler |
| 5,973,296 A | 10/1999 | Juliano et al. |
| 6,040,528 A | 3/2000 | Kitamura et al. |
| 6,305,923 B1 | 10/2001 | Godwin et al. |
| 6,394,784 B1 | 5/2002 | Gellert et al. |
| 6,561,789 B2 | 5/2003 | Gellert et al. |
| 6,638,053 B2 | 10/2003 | Gellert et al. |
| 6,649,095 B2 | 11/2003 | Buja |
| 6,761,557 B2 | 7/2004 | Gellert et al. |
| 7,108,502 B2 | 9/2006 | Gellert et al. |
| 7,131,831 B2 | 11/2006 | Bazzo et al. |
| 2006/0292256 A1 | 12/2006 | Gellert et al. |

FOREIGN PATENT DOCUMENTS

| | | |
|---|---|---|
| DE | 8620956 U | 11/1986 |
| DE | 9201797.5 U1 | 5/1992 |
| DE | 4242505 A1 | 6/1994 |
| DE | 19941038 A1 | 3/2001 |
| EP | 444748 A1 | 9/1991 |
| EP | 590621 A1 | 4/1994 |
| EP | 748678 A1 | 12/1996 |
| EP | 765728 A2 | 4/1997 |
| EP | 963829 A1 | 12/1999 |
| EP | 1302295 A3 | 5/2003 |
| EP | 1302296 A3 | 5/2003 |
| JP | 10-58518 | 3/1989 |
| WO | WO-01/15884 | 3/2001 |

OTHER PUBLICATIONS

Husky, "1250 Series Nozzles," (2000).
Husky, "Hot Runner Systems," (Oct. 1998).
Husky, "Husky 1250 JP Pamphlet," (Oct. 1998).

COMPACT CARTRIDGE HOT RUNNER NOZZLE

CROSS-REFERENCE TO RELATED APPLICATIONS

This application is a divisional of U.S. application Ser. No. 11/510,994 filed Aug. 28, 2006 which is a continuation of U.S. application Ser. No. 10/601,190 filed Jun. 23, 2003 that issued as U.S. Pat. No. 7,108,502 on Sep. 19, 2006, which is a divisional of U.S. application Ser. No. 10/025,767 filed Dec. 26, 2001 that issued as U.S. Pat. No. 6,638,053 on Oct. 28, 2003, which is a continuation of U.S. application Ser. No. 09/520,843 filed Mar. 8, 2000 that issued as U.S. Pat. No. 6,394,784 on May 28, 2002, the entire disclosures of which are hereby incorporated by reference.

BACKGROUND OF THE INVENTION

1. Field of the Invention

This invention relates generally to injection molding and more particularly to an injection molding nozzle having an integral electrical heating element surrounded by layered dielectric insulation.

2. Related Art

Heaters for injection molding and hot runner applications are known in the prior art, as demonstrated amply by the following U.S. Pat. Nos. 2,991,423, 2,522,365, 2,769,201, 2,814,070, 2,875,312, 2,987,300, 3,062,940, 3,550,267, 3,849,630, 3,911,251, 4,032,046, 4,403,405, 4,386,262, 4,557,685, 4,635,851, 4,644,140, 4,652,230, 4,771,164, 4,795,126, 4,837,925, 4,865,535, 4,945,630, and 4,981,431.

Heaters are of course also amply known in non-injection molding applications, as shown for example in U.S. Pat. Nos. 2,088,586, 2,378,530, 2,794,504, 4,438,322 and 4,621,251.

There are in general three types of heaters known for use in the hot runner nozzles. The first is so-called "integral heaters" which are embedded or cast in the nozzle body. Examples of such nozzles are disclosed in the following patents: U.S. Pat. No. 4,238,671, U.S. Pat. No. 4,386,262, U.S. Pat. No. 4,403,405 and EP 765728. The second is so-called "independent external heaters" which have their own support and that can be removed and replaced. Essentially, in such a design, shown in FIG. 1a, the heating element H is external to the nozzle body N. Heating element H comprises a resistance wire W surrounded by electrical insulating material E and is encased in a steel casing C. Examples of such nozzles are disclosed in the following patents: U.S. Pat. No. 3,553,788, U.S. Pat. No. 3,677,682, U.S. Pat. No. 3,831,004, U.S. Pat. No. 3,912,907, U.S. Pat. No. 4,588,367, U.S. Pat. No. 5,360,333, U.S. Pat. No. 5,411,393, U.S. Pat. No. 5,820,900, EP 748678, EP 963829 and EP 444748. The third is so-called "attached external heaters" which are positioned spirally around the exterior of the nozzle or the nozzle tip but cannot be removed therefrom by reason of being brazed or embedded in the nozzle surface. Referring to FIG. 1b, heating element H' is embedded in a groove G' in nozzle body N'. Examples of such nozzles are disclosed in the following patents: U.S. Pat. No. 4,557,685, U.S. Pat. No. 4,583,284, U.S. Pat. No. 4,652,230, U.S. Pat. No. 5,226,596, U.S. Pat. No. 5,235,737, U.S. Pat. No. 5,266,023, U.S. Pat. No. 5,282,735, U.S. Pat. No. 5,614,233, U.S. Pat. No. 5,704,113 and U.S. Pat. No. 5,871,786.

Electrical heaters have been also used in the design of the so-called hot runner probes. Unlike the hot runner nozzles, the hot runner probes do not comprise the melt channel. The probes are located inside the melt channel of the nozzle and thus create an annular flow. The melt is heated from the inside and this heating approach is not applicable to all materials and applications. Examples of such nozzles are disclosed in the following U.S. Pat. Nos. 3,800,027 3,970,821, 4,120,086, 4,373,132, 4,304,544, 4,376,244, 4,438,064, 4,492,556, 4,516,927, 4,641,423, 4,643,664, 4,704,516, 4,711,625, 4,740,674, 4,795,126, 4,894,197, 5,055,028, 5,225,211, 5,456,592, 5,527,177 and 5,504,304.

Injection molding nozzles having integral heaters typically have electrical heating elements, wound spirally around the nozzle, which offer an efficient response to the many critical process conditions required by modem injection molding operations. There has been a continuous effort in the prior art, however, to improve the temperature profile, the heating efficiency and durability of such nozzles and achieve an overall reduction in size. Most of these efforts have been aimed at improving the means of heating the nozzle.

For example, U.S. Pat. No. 5,051,086 to Gellert discloses a heater element brazed onto the nozzle housing and then embedded in multiple layers of plasma-sprayed stainless steel and alumina oxide. To avoid cracking of the ceramic layers caused by excessive thickness and the differing thermal properties of the ceramic and the stainless steel, Gellert employs alternating thin layers of stainless steel and alumina oxide. The heating element of Gellert is a nickel-chrome resistance wire (i.e. see W in FIGS. 1a and 1b herein) extending centrally through a refractory powder electrical insulating material (i.e. see E in FIGS. 1a and 1b), such as magnesium oxide, inside a steel casing (i.e. see C in FIGS. 1a and 1b). The heating element is integrally cast in a nickel alloy by a first brazing step in a vacuum furnace, which causes the nickel alloy to flow by capillary action into the spaces around the heater element to metallurgically bond the steel casing of the element to the nozzle body. This bonding produces very efficient and uniform heat transfer from the element to the nozzle body.

Nozzles with this type of electrical heaters, however, are often too big to be used in small pitch gating due to the size of the insulated heater required. These heaters are also generally expensive to make because of complex machining required. Also, the manufacturing methods to make these nozzle heaters are complex and therefore production is time consuming.

U.S. Pat. No. 5,955,120 to Deissler which discloses a hot runner nozzle with high thermal insulation achieved by coating the electrical heater with layers of a thermally insulation materials (mica or ceramic) and high wear resistance material (titanium). Like Gellert, the heater element of Deissler has its own electrical insulation protection and thus can be placed in direct contact with the metallic nozzle body (see FIG. 2 of Deissler). Also the heater element of Deissler is attached to the nozzle by casting (brazing) a metal such as brass. Deissler is thus similar to Gellert in that it discloses an insulated and brazed heater element. Again, as with Gellert, such a device requires many additional steps to braze and insulate the heater and is therefore time consuming. Also, as with Gellert, the use of an insulated element makes the size of the heated nozzle not well suited for small pitch applications.

In an attempt to reduce nozzle size, U.S. Pat. No. 5,973,296 to Juliano shows a thick film heater applied to the outside surface of an injection nozzle. The nozzle heater comprises a dielectric film layer and a resistive thick film layer applied directly to the exterior cylindrical surface of the nozzle by means of precision thick film printing. The thick film is applied directly to the nozzle body, which increases the nozzle's diameter by only a minimal amount. Flexibility of heat distribution is also obtained through the ability to apply the heater in various patterns and is, thus, less limited than spiral designs.

There are limitations to the thick film heater, however. Thermal expansion of the steel nozzle body during heating can cause unwanted cracking in the film layers due to the lower thermal expansion of the film material. This effect is particularly acute after a large number of injection cycles. The cracks could affect the resistive film heater because it is not a continuous and homogeneous material (as is a wire), but rather the fine dried powder of the conductive ink, as disclosed in Juliano '296.

Another heated nozzle design is disclosed in U.S. Pat. No. 4,120,086 to Crandell. In one embodiment, Crandell '086 discloses an electrically heated nozzle having an integral heater comprising a resistance wire heater disposed between two ceramic insulating layers. The Crandell '086 nozzle is made by wrapping a metal nozzle body with flexible strips of green (ie. unsintered) ceramic particles impregnated in heat dissipatable material, subsequently winding a resistance wire heating element around the wrapped green layer, wrapping a second layer of the flexible strips of green ceramic particles thereover, heat treating the assembly to bake out the heat dissipatable material and sinter the ceramic particles together, and then compacting the assembly to eliminate air voids in the assembly. In U.S. Pat. No. 4,304,544, also to Crandell, the inventor further describes the flexible green ceramic strips as comprising a body of green ceramic insulator particles which are impregnated in a heat dissipatable binder material. In the green state, such strips are pliable and bendable, permitting them to be wrapped around the metal nozzle core, but when baked, the strips become hard and the particles agglomerate into a mass.

The Crandell '086 and '544 nozzle has relatively thick ceramic layers, employs an awkward process for applying the ceramic layers and requires additional heat treatment steps in fabrication. Crandell '086 concedes that the baking step is time consuming (see column 5, lines 20-25) and therefore admits that the design is less preferable than other embodiments disclosed in the patent which do not utilize this method. Also, as mentioned above, it is desirable to reduce nozzle size, which is not possible with the thick ceramic strips of Crandell '086 and '544.

The use of ceramic heaters for both hot runner nozzle heaters and hot runner probe heaters is also disclosed in U.S. Pat. No. 5,504,304 to Noguchi. Noguchi, like Juliano, uses a printing method to form an electrical resistive wire pattern of a various pitch from a metal or a composite paste. A ceramic heater embodiment for a nozzle probe (shown in FIG. 1 of Noguchi) is made by printing various electrical resistive patterns shown in FIGS. 3-4 of Noguchi. Noguchi discloses a method whereby a mixture of insulating ceramic powder such as silicon carbide (SiC), molybdenum silicide ($MoSi_2$) or alumina ($Al_2O_3$) and silicon nitride (SiN), and electrically conductive ceramic powder such as titanium nitride (TiN) and titanium carbide (TiC) is sintered and kneaded into a paste, which is then printed in a snaking manner on the external surface of a cylindrical insulating ceramic body, as shown in FIG. 3 of Noguchi. The printing state is made denser in certain areas and, by so controlling the magnitude of the so-called "wire density," a temperature gradient is given to the heater. The heater pattern can be formed using metals such as tungsten, molybdenum, gold and platinum. A ceramic heater embodiment for a hot runner nozzle is also disclosed in Noguchi (see FIG. 9 of Noguchi). This self-sustained ceramic heater is also made by wire-printing using the same paste or metals. The heater is placed over the nozzle body and is then sintered and kneaded into a paste comprising a mixture of insulation ceramic powder such as silicon carbide, molybdenum silicide or alumina and conductive ceramic powder such as titanium nitride and titanium carbide. The paste is printed in a single snaking line on the part where, again, the heater pattern is formed by applying temperature gradients by varying the magnitude of wire density across the part.

Although Noguchi introduces a wire-printing method to achieve a certain heat profile along the nozzle it does not teach or show how this wire-printing method is actually implemented. More detailed information about this wire-printing method is provided by the patentee's (Seiki Spear System America. Inc.) catalogue entitled "SH-1 Hot Runner Probe" (undated). According to the catalogue, the circuit pattern, which provides the resistance for heating, is screen printed direction onto a "green" or uncured ceramic substrate. The flexible "green" substrate with the printed circuit is wrapped around an existing ceramic tube and the complete unit is fired and cured to produce a tubular heater. The resistive circuit pattern is encased within the ceramic between the tube and the substrate and has no exposure to the outside atmosphere. The thermocouple is inserted through the centre of the tubular heater and positioned in the tip area. Thermocouple placement in the probe tip gives direct heat control at the gate. The ceramic heater unit is then fixed outside the probe body. Thus, this Seiki Spear method of making a ceramic heater body according to Noguchi including a printed-wire is similar to the method disclosed in Crandell '086, with the exception that Crandell uses a self-sustained resistance wire wound spirally around the nozzle between two "green" ceramic layers. As with Crandell, as well, an additional sintering step is required to sinter the green ceramic layers.

Accordingly, there is a need for a heated nozzle which overcomes these and other difficulties associated with the prior art. Specifically, there is a need for a heated nozzle which is simpler to produce and yields a more compact design.

SUMMARY OF THE INVENTION

The present invention provides an injection molding nozzle which is smaller in diameter than most prior art nozzles but which does not sacrifice durability or have the increased manufacturing costs of previous small diameter nozzles. Further the nozzle of the present invention is simpler, quicker and less costly to produce than prior art nozzles and minimizes the number of overall steps required in production. In particular, the need for heat treating the dielectric materials of the heater is removed entirely, saving time, money and hassle in fabrication. Further, the apparatus of the present invention provides a removable and/or replaceable cartridge heater design which offers the advantage of low-cost repair or replacement of a low cost heater component, rather than wholesale replacement of an intricately and precisely machined nozzle. The methods of the present invention similarly provide reduced and simplified steps in manufacturing, as well as permitting precise temperature patterns to be achieved in a nozzle more simply than with the prior art.

In one aspect, the present invention provides an injection molding nozzle comprising a nozzle body having an outer surface and at least one melt channel through the body, a first insulating layer having a chemical composition, the first insulating layer disposed on the nozzle body outer surface so as to substantially cover at least a portion of the nozzle body, at least one wire element disposed exterior to and in contact with the first insulating layer, the at least one wire element being connectable to a power supply capable of heating the wire element, a second insulating layer having a chemical composition, the second insulating layer disposed over the first insulating layer and the at least one wire element, the second insulating layer substantially covering the at least one wire element and at least a portion of the first insulating layer, and wherein the chemical compositions of the first and second insulating layers remain substantially unchanged once the layers are disposed on the nozzle body.

In a second aspect, the present invention provides an injection molding nozzle comprising a nozzle body assembly having an outer surface and at least one melt channel through the assembly, the assembly having a core and a surface layer disposed around the core, the surface layer forming at least a portion of the nozzle body assembly outer surface, the core being composed of a first metal and the surface layer being composed of a second metal, the second metal having a higher thermal conductivity than the first metal, a first insulating layer disposed on the nozzle body assembly outer surface so as to substantially cover at least a portion of the outer surface, at least one wire element disposed exterior to and in contact with the first insulating layer, the at least one wire element being connectable to a power supply capable of heating the wire element and a second insulating layer disposed over the first insulating layer and the at least one wire element, the second insulating layer substantially covering the at least one wire element and at least a portion of the first insulating layer.

In a third aspect, the present invention provides an injection molding nozzle comprising a nozzle body having an outer surface and at least one melt channel through the body, a first insulating layer disposed on the nozzle body outer surface so as to substantially cover at least a portion of the nozzle body, at least one wire element disposed exterior to and in contact with the first insulating layer, the at least one wire element being connectable to a power supply capable of heating the wire element, a second insulating layer disposed over the first insulating layer and the at least one wire element, the second insulating layer substantially covering the at least one wire element and at least a portion of the first insulating layer, and wherein the first insulating layer is between 0.1 mm and 0.5 mm in thickness.

In a fourth aspect, the present invention provides an injection machine for forming a molded article, the machine comprising a mold cavity, the mold cavity formed between a movable mold platen and a stationary mold platen, at least one injection molding nozzle connectable to a source of molten material and capable of feeding molten material from the source to the mold cavity through at least one melt channel therethrough, the at least one nozzle injection molding having a nozzle body having an outer surface and the at least one melt channel through the body, a first insulating layer having a chemical composition, the first insulating layer disposed on the nozzle body outer surface so as to substantially cover at least a portion of the nozzle body, at least one wire element disposed exterior to and in contact with the first insulating layer, the at least one wire element being connectable to a power supply capable of heating the wire element, a second insulating layer having a chemical composition, the second insulating layer disposed over the first insulating layer and the at least one wire element, the second insulating layer substantially covering the at least one wire element and at least a portion of the first insulating layer, and wherein the chemical compositions of the first and second insulating layers remain substantially unchanged once the layers are disposed on the nozzle body.

In a fifth aspect, the present invention provides an injection mold to form an article, the mold comprising a mold half capable of communication with a mold manifold, at least one injection molding nozzle in flow communication with the mold half through at least one melt channel, the at least one nozzle injection molding having a nozzle body having an outer surface and the at least one melt channel through the body, a first insulating layer having a chemical composition, the first insulating layer disposed on the nozzle body outer surface so as to substantially cover at least a portion of the nozzle body, at least one wire element disposed exterior to and in contact with the first insulating layer, the at least one wire element being connectable to a power supply capable of heating the wire element, a second insulating layer having a chemical composition, the second insulating layer disposed over the first insulating layer and the at least one wire element, the second insulating layer substantially covering the at least one wire element and at least a portion of the first insulating layer, and wherein the chemical compositions of the first and second insulating layers remain substantially unchanged once the layers are disposed on the nozzle body.

In a sixth aspect, the present invention provides an injection molding nozzle comprising the steps of providing a nozzle body, the nozzle body having an outer surface and at least one melt channel through the body providing a first insulating layer on the outer surface of the nozzle body, the first insulating layer having a chemical composition, the first insulating layer substantially covering at least a portion of the nozzle body outer surface, positioning at least one wire element exterior to and in contact with the first insulating layer, the at least one wire element being connectable to a power supply capable of heating the at least one wire element, providing a second insulating layer on the first insulating layer and the at least one wire element, the second insulating layer having a chemical composition, the second insulating layer substantially covering the at least one wire element and at least a portion of the first insulating layer, and wherein the chemical compositions of the first and second insulating layers remain substantially unchanged once the layers are provided on the nozzle body.

In a seventh aspect, the present invention provides an injection molding nozzle comprising the steps of providing a nozzle body, the nozzle body having an outer surface and at least one melt channel through the body positioning a self-supporting insulating sleeve around the nozzle body, the sleeve substantially covering at least a portion of the nozzle body outer surface positioning at least one wire element exterior to and in contact with the insulating sleeve, the at least one wire element being connectable to a power supply capable of heating the at least one wire element, providing a second insulating layer on the insulating sleeve and the at least one wire element, the second insulating layer substantially covering the at least one wire element and at least a portion of the insulating sleeve.

BRIEF DESCRIPTION OF THE FIGURES

For a better understanding of the present invention, and to show more clearly how it may be carried into effect, reference will now be made by way of example to the accompanying drawings.

The drawings show articles made according to embodiments of the present invention.

DETAILED DESCRIPTION OF THE INVENTION

Figure 1A:
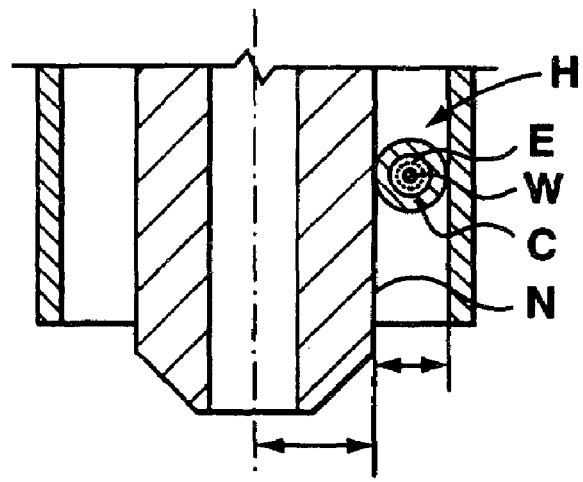
FIGS. 1a and 1b are partial sectional views of heated nozzle configurations according to the prior art.
Figure 1B:
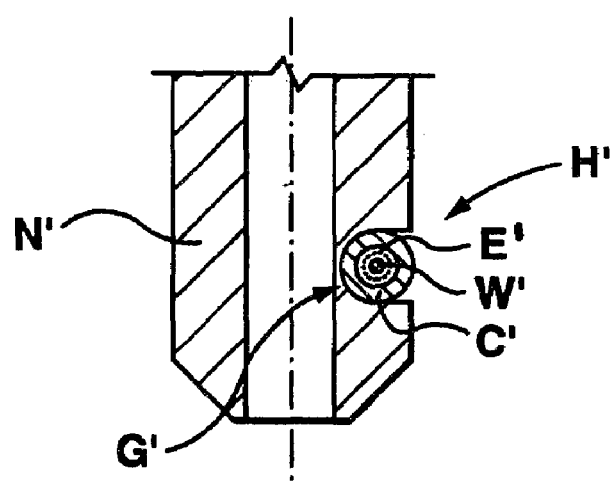
Figure 2:
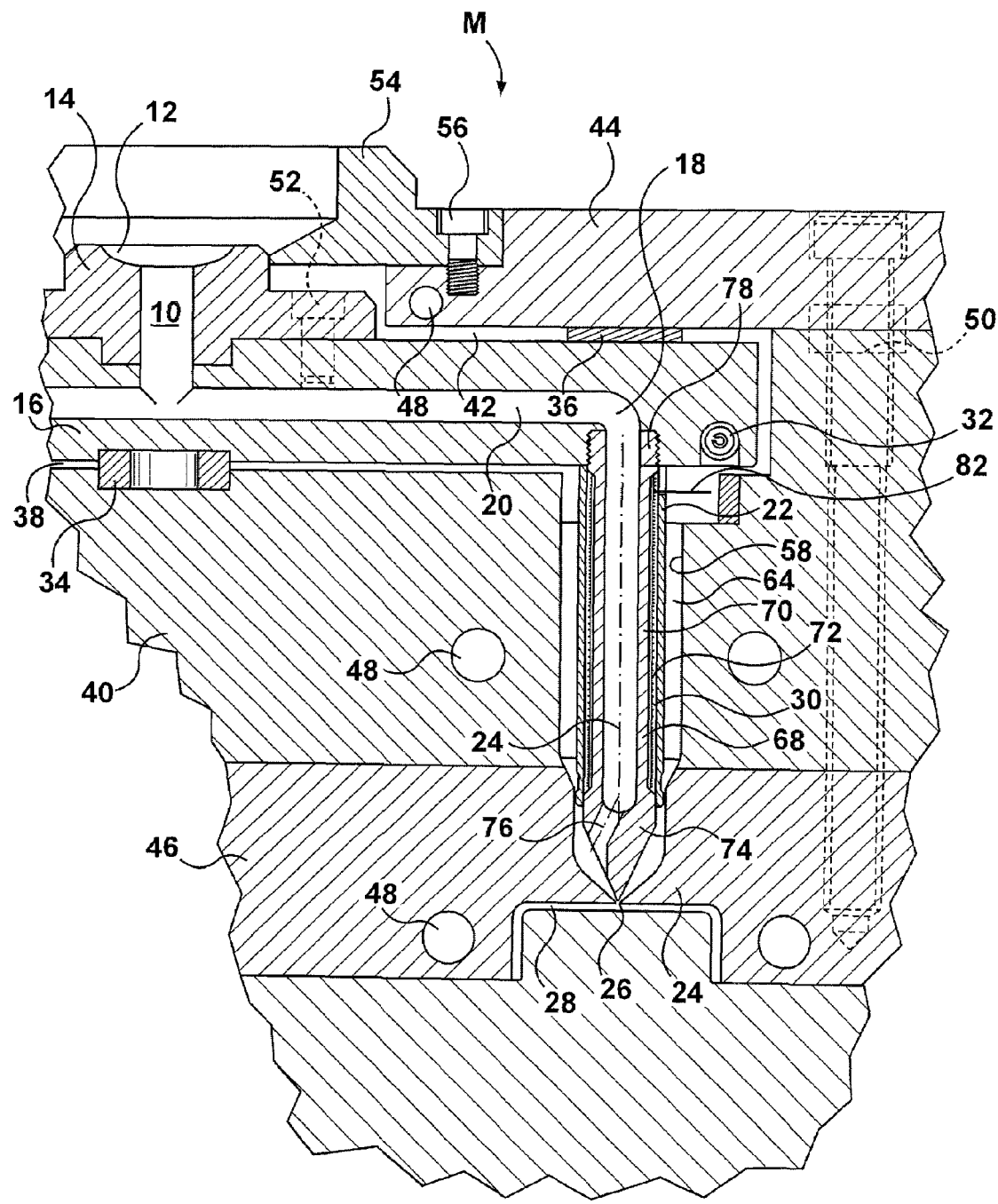
FIG. 2 is a sectional view of a portion of an injection molding system showing a heated nozzle according to a preferred embodiment of the present invention.

A multi-cavity injection molding system made in accordance with the present invention is shown in the Figures generally at M. Referring to FIG. 2, a portion of injection molding system M is shown. A melt passage 10 extends from a common recessed inlet 12 in a manifold extension 14 to an elongated manifold 16 where it branches out to a number of outlets 18. As can be seen, each branch 20 of melt passage 10 extends through a steel nozzle 22, having a central melt bore 24 in communication with melt passage outlet 18 from manifold 16 to a gate 26 leading to each cavity 28. Nozzle 22 is a heated nozzle having a heater 30 according to a preferred embodiment of the invention, as described in greater detail below.

Manifold 16 is heated by a heating element 32 which may be integrally brazed into it. Manifold 16 is held in place by a central locating ring 34 and insulating pressure pads 36. Locating ring 34 bridges an insulative air space 38 between manifold 16 and a cooled spacer plate 40. Pressure pads 36 provide another insulative air space 42 between manifold 16 and a cooled clamp plate 44. Spacer plate 40, clamp plate 44 and cavity plate 46 are cooled by pumping cooling water through a plurality of cooling conduits 48. Clamp plate 44 and spacer plate 40 are secured in place by bolts 50 which extend into cavity plate 46. Manifold extension 14 is held in place by screws 52 and a locating collar 54 which is secured to the clamp plate 44 by screws 56.

Each nozzle 22 is seated in a well 58 in spacer plate 40. An insulative air space 64 is provided between heated nozzle 22 and the surrounding cooled spacer plate 40.

Figure 3:
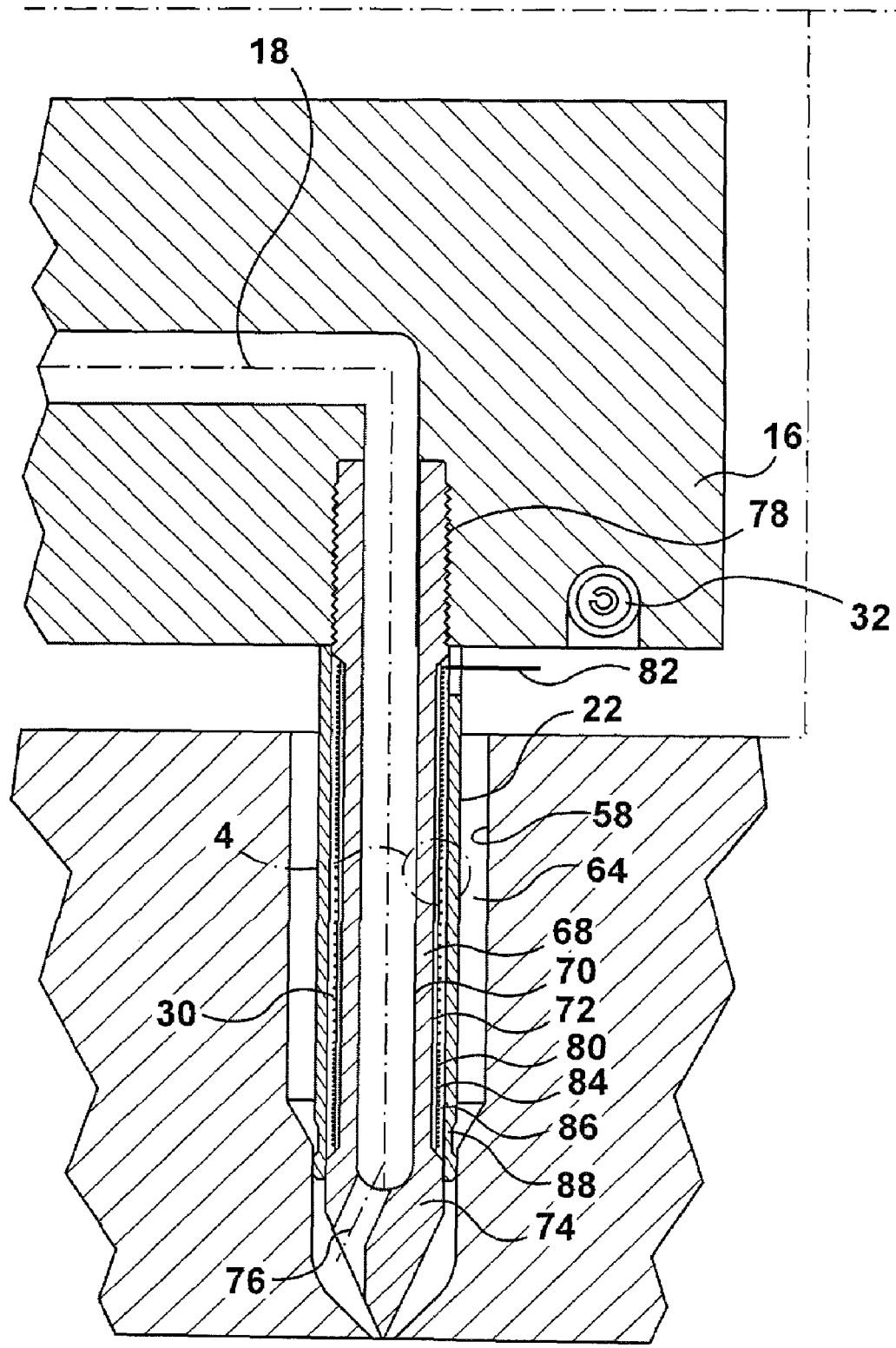
FIG. 3 is an enlarged sectional view of the nozzle of FIG. 2.
Figure 4:
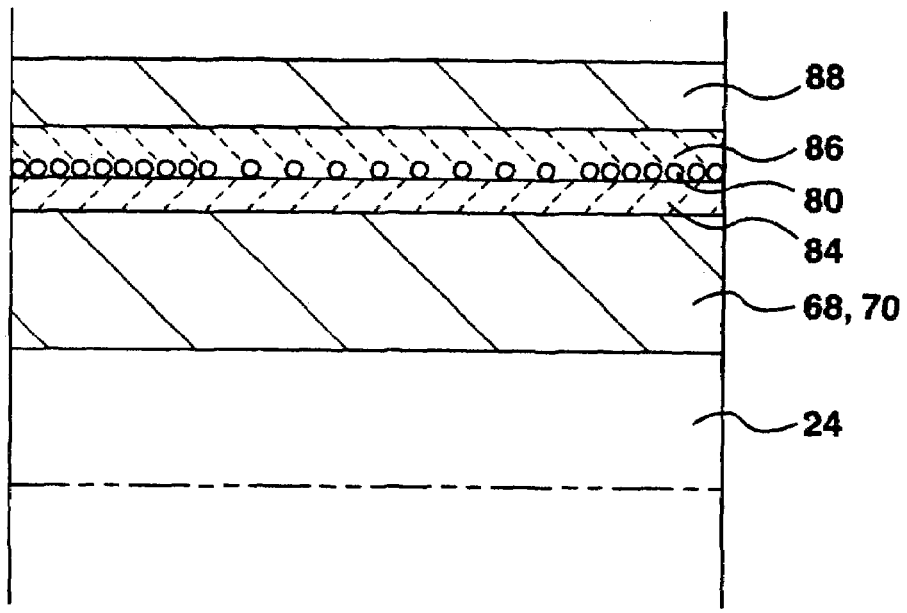
FIG. 4 is a further enlarged and rotated (90° counter-clockwise) sectional view of the heater assembly of the nozzle of FIG. 2.

Referring to FIGS. 2 and 3, nozzle 22 has a body 68 having a steel central core portion 70, an outer surface 72, and a tip 74, which is seated in gate 26. Tip 74 has a flow channel 76 which is aligned with central melt bore 24. Nozzle 22 is seated and secured in manifold 16 by a threaded portion 78. Heater assembly 30 has an electrical resistive wire heating element 80, having cold pin connections 82 for connecting wire element 80 to a power supply (not shown). Heater assembly 30 also has a first insulating layer 84 and a second insulating layer 86 disposed on either side of wire element 80, so as to "sandwich" element 80 therebetween. First layer 84 is positioned on core 70, with wire element 80 wrapped therearound, and second layer 86 positioned thereover. An outer steel layer 88 is provided to finish nozzle 22. These layers are provided in a manner as will be described in more detail below.

Wire element 80 is a simple, bare, electrically and thermally uninsulated wire, preferably of thirty (30) gauge chromium nickel, though any wire material having resistive heating characteristics may be employed. Wire element 80 is preferably wrapped around nozzle 22, and may be provided in any arrangement which provides the temperature distribution desired for a particular application. For example, in the embodiment of FIG. 3, successive windings of wire element 80 are closer together at the ends of nozzle 22, where more heat is typically required, with a more spaced distribution occurring in the central portion of nozzle 22.

According to the present invention, first layer 84 and second layer 86 are dielectric materials which can be applied in a "finished" (i.e. "non-green") state to the nozzle body. In other words, the dielectric material does not require additional heat treating steps once it is applied to the nozzle assembly, and thus has a chemical composition which does not change after it is applied to the apparatus and the material does not require heat treating of sintering to achieve its "finished" state. In addition to this constraint, first layer 84 is also preferably a dielectric material which can withstand the high operating temperatures and heater wattages experienced in hot runner injection molding. As one skilled in the art will understand, the dielectric is preferably a good thermal conductor with low heat capacity, a combination which encourages rapid heating (and cooling) with maximum efficiency. The dielectric should also be a good electrical insulator, since wire element is otherwise uninsulated from nozzle 22. The choice of material depends also on the temperature target for the molten material which will flow through the melt channel of the nozzle.

Illustrative of the dielectric materials which can be used in the practice of this invention are: aluminum oxide; magnesium oxide; mica coatings; Vespel™ (trade mark of E.I Du Pont de Nemour & Company); graphite; alumina; alumina-silica; zirconia-based materials, such as tetragonal zirconia polycrystals (TZP) partially stabilised zirconia (PSZ), fully stabilised zirconia (FSZ), transformation toughened ceramics (TTC), zirconia toughened alumina (ZTA) and transformation toughened zirconia (TTZ); Cerama-Dip™538N (trade mark of Aremco Products Inc.), a zirconium silicate-filled water-based high temperature dielectric coating for use in insulating high-power resistors, coils and heaters; and Ceramacoat™ 538N (trade mark of Aremco Products Inc.) is a silica based, high temperature dielectric coating for use in insulating induction heating coils. Aluminum oxide is a preferred material because of its relatively high thermal conductivity.

Second layer 86 is provided to protect wire element 80 from the deleterious effects of the atmosphere, such as oxidation and corrosion, and to insulate the exterior of nozzle 22 electrically and thermally, so as to direct the output of heater assembly 30 towards the melt in flow channel 76. Second layer 86 may be made from the same dielectric material as first layer 84 or a different material. In some applications, it may be desirable to use different materials. For example, the first layer 84 may be fabricated from a material having good electric insulating properties but high heat conductive characteristic, while the second layer 86 is of a material having high electric insulating properties and high heat insulating properties, so that the heat is directed to the central melt bore 24 within body 68, while outer layer 88 remains cooler. The use of the same material, preferably aluminum oxide, for first layer 84 and second layer 86 is preferred.

First layer 84 and second layer 86 may be provided as particles or a liquid sprayed onto the nozzle apparatus, as a liquid "painted" onto the apparatus or as a solid, pre-fabricated, self-supporting sleeve, as described in more detail below. The layers may be provided in thicknesses as desired to suit a particular application. Thicknesses of the layers can range from 0.1 mm to 3 mm, and thicker, depending on the amount of insulating, overall nozzle diameter and method of fabrication desired, as will be described further below. Thicknesses in the range of 0.1 mm to 0.5 mm are preferred.

Outer layer 88 may be applied by spraying or by shrink-fitting a sleeve on second layer 86. Outer layer 88 may have any desired thickness, though a thickness of about 1.5 mm is preferred.

Figure 5:
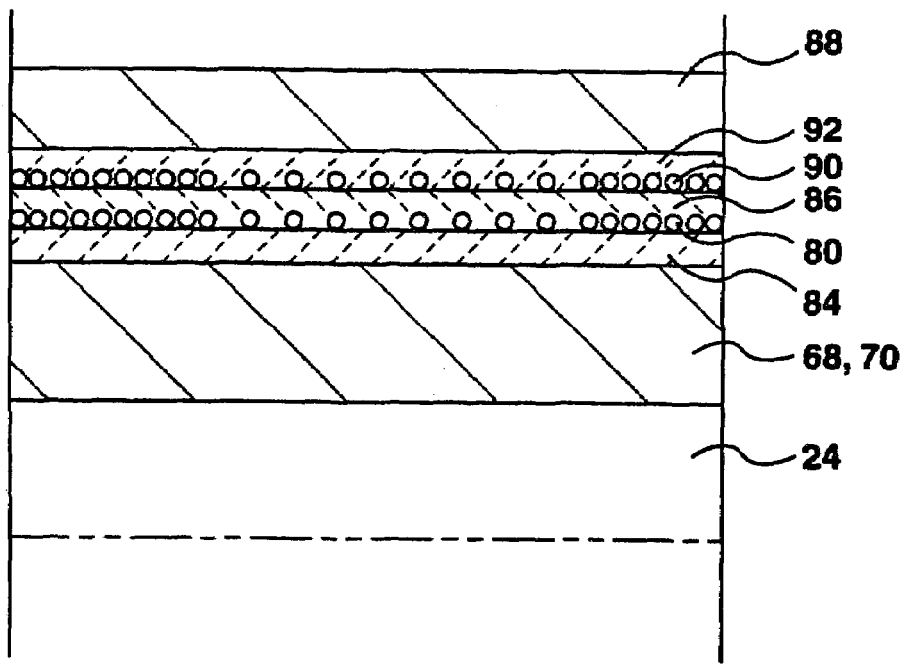
FIG. 5 is an enlarged sectional view, similar to FIG. 4, of an alternate embodiment of a nozzle heater assembly according to the present invention.
Figure 6:
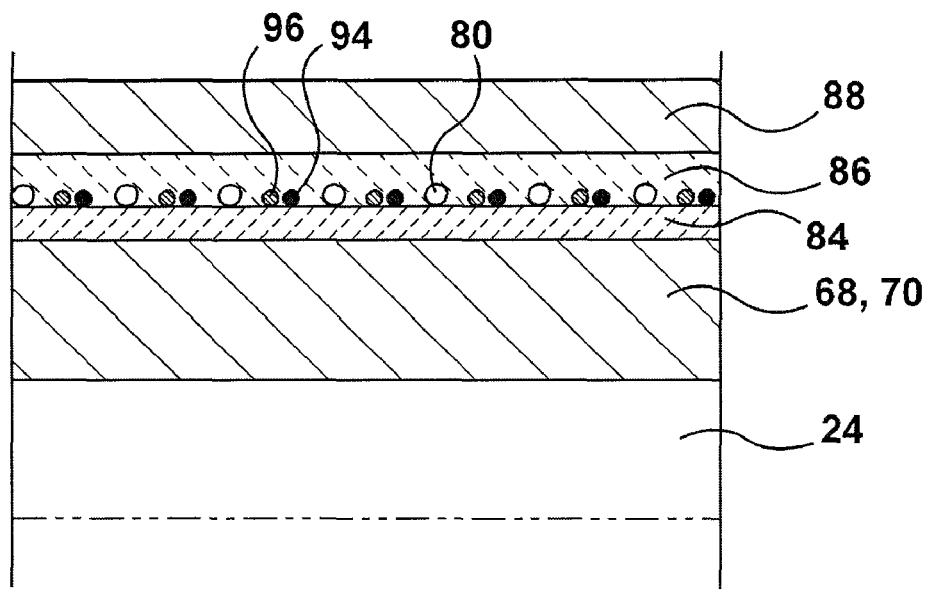
FIG. 6 is an enlarged sectional view, similar to FIG. 4, of another alternate embodiment of a nozzle heater assembly according to the present invention.
Figure 7:
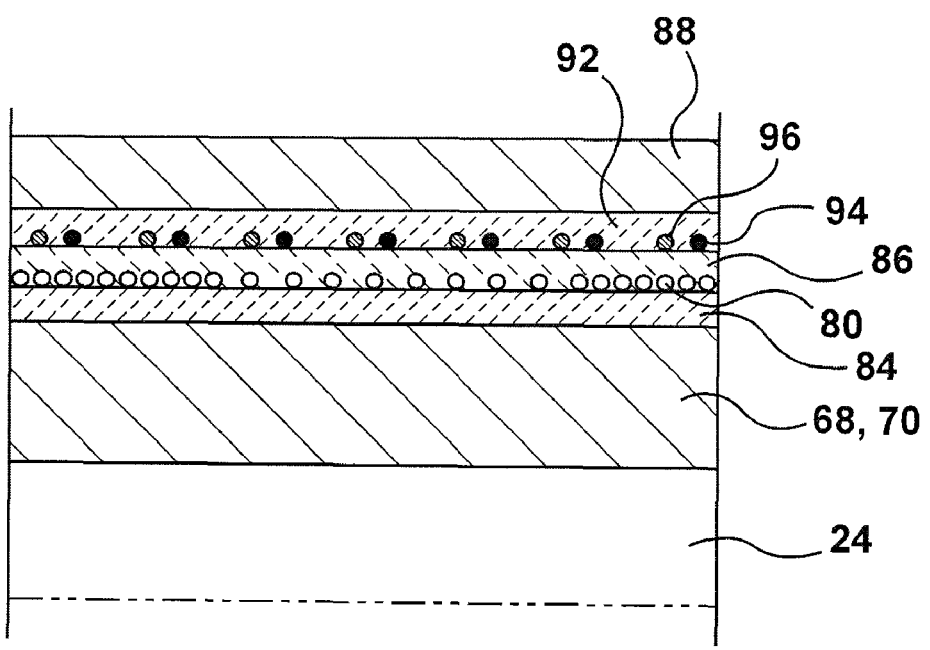
FIG. 7 is an enlarged sectional view, similar to FIG. 4, of a further alternate embodiment of a nozzle heater assembly according to the present invention.

Referring to FIGS. 4-7, other embodiments of a nozzle heater according to the present invention are shown. In the embodiment of FIG. 5, a secondary wire element 90 is provided around second layer 86, protected by a third insulating layer 92. In this three-layer embodiment, second layer 86 is preferably a good heat conductor and electrical insulator while third layer 92 is a dielectric having good thermal insulating characteristics. Third layer 92 can be chosen from the same set of materials as described above for layers 84 and 86. This embodiment permits a higher wattage heater to be obtained, at the obvious expense of a slightly larger nozzle diameter. Alternatively, secondary wire element 90 can provide redundancy for operational use if and when the primary wire element fails. FIG. 6 shows a configuration similar to FIG. 4, but with integral temperature sensors or thermocouple wires 94 and 96 positioned between first layer 84 and second layer 86, wound spirally around nozzle 22 adjacent wire element 80. Inclusion of thermocouples 94 and 96 allow for exacting temperature control in nozzle 22, as will be understood by one skilled in the art. The thermocouples may be disposed immediately adjacent wire element 80, as shown in FIG. 6, or may be provided between second layer 86 and third insulating layer 92, as depicted in FIG. 7. In this embodiment, second layer 86 and third layer 92 preferably have similar characteristics as described above for the FIG. 5 embodiment.

Figure 8:
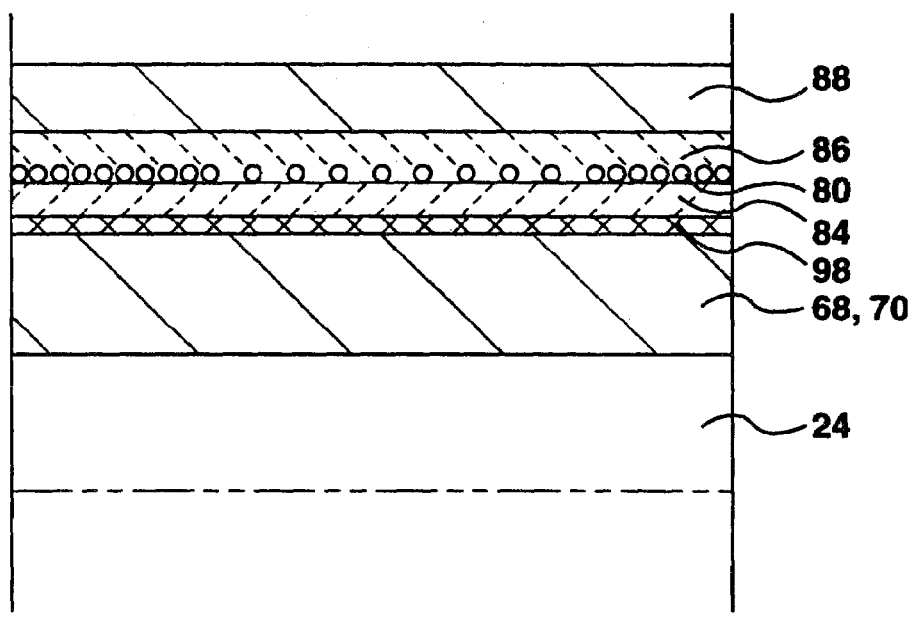
FIG. 8 is an enlarged sectional view, similar to FIG. 4, of a yet further alternate embodiment of a nozzle heater assembly according to the present invention.

Referring to FIG. 8, in a further alternate embodiment, a metal surface layer 98 is provided on outer surface 72, between nozzle core 70 and first layer 84. Surface layer 98 is a layer of a metal having a higher thermal conductivity than steel nozzle body 68, such as copper and alloys of copper. Surface layer 98 thus promotes a more even distribution of heat from heater assembly 30 to the pressurized melt in central melt bore 24. Surface layer 98 may be applied by spraying or by shrink-fitting a sleeve on core 70. Surface layer 98 may have a thickness of between 0.1 mm to 0.5 mm, or greater if desired.

Figure 9:
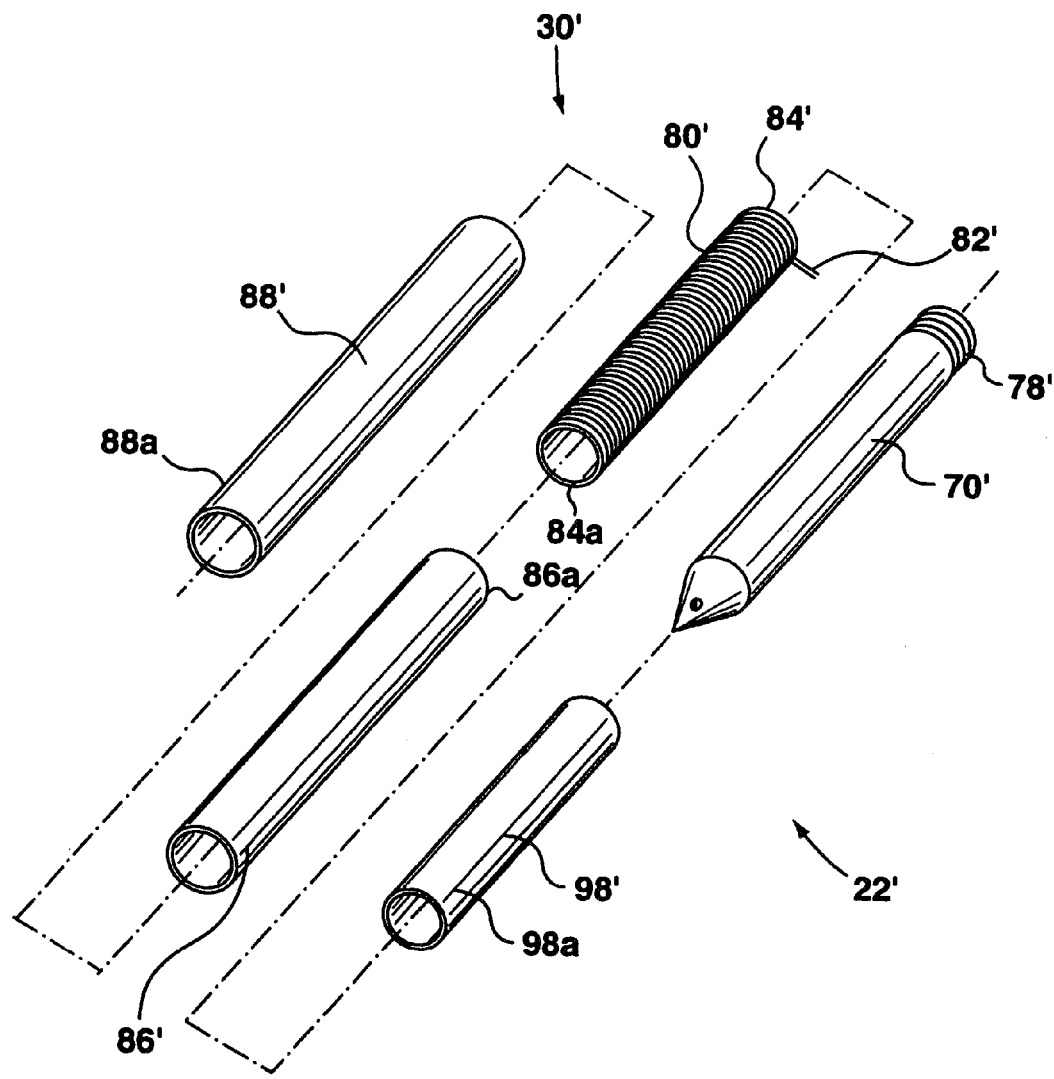
FIG. 9 is an exploded isometric view of an alternate embodiment of the nozzle heater of the present invention.

Referring to FIG. 9, in an alternate embodiment of the present invention, nozzle 22' has a core 70', a surface layer 98' and a heater assembly 30', which is composed of a first layer 84', a wire element 80', a second layer 86' and an outer layer 88'. In this embodiment, surface layer 98', first layer 84', second layer 86' and outer layer 88' are, in fact, self-supporting, substantially rigid, annular telescoping sleeve components 98a, 84a, 86a, and 88a, respectively, which are pre-fabricated, prior to assembly of nozzle 22', according to a method of the present invention, described below. This sleeve construction permits a heater assembly 30' configuration which is selectively removable in part or in whole, depending on the design, from nozzle 22' for periodic inspection, repair and/or replacement. Also, this sleeve construction permits the nozzle body to expand independently from the insulating layers, by virtue of the separate and self-supporting nature of the heater sleeves. Thus, when thermal expansion occurs in the nozzle, nozzle body 68 is free to grow longitudinally while the insulating sleeves and wire, which typically have lower thermal expansion characteristics, will not be subject to a mechanical stress induced by this nozzle body expansion. This feature has beneficial implications for increased heater durability.

The self-supporting annular sleeves of this embodiment may be made of any suitable dielectric material, as described above, that can be machined, molded or extruded into a thin-walled tube. As with the previous embodiments, it is desirable that the coefficient of thermal transfer to be higher for inner sleeve than the outer sleeve. Both sleeves are preferably made of the same materials.

Further, as one skilled in the art will appreciate, the various layers of a particular heater need not all be applied in an identical manner but rather a combination of layer types may be employed. One will further appreciate that the removability benefit of the sleeve embodiment requires that only at least one of the layers be a self-supporting sleeve, to permit it to be slidably removed from the nozzle assembly. For example, if first layer 84' is provided as a self-supporting sleeve, second layer 86 may be applied directly to first layer 84 (and over wire element 80, as well) by spraying or other coating method, as described further below. Conversely, in a particular application, it may be desirable to spray or otherwise coat a first layer 84 onto the nozzle body, and provide second layer 86 in a sleeve format. In such a configuration, wire element 80' may be integrally provided on the interior of the second layer sleeve element, so as to be removable therewith. Other combinations of layer construction are equally possible, as described below.

Figure 10:
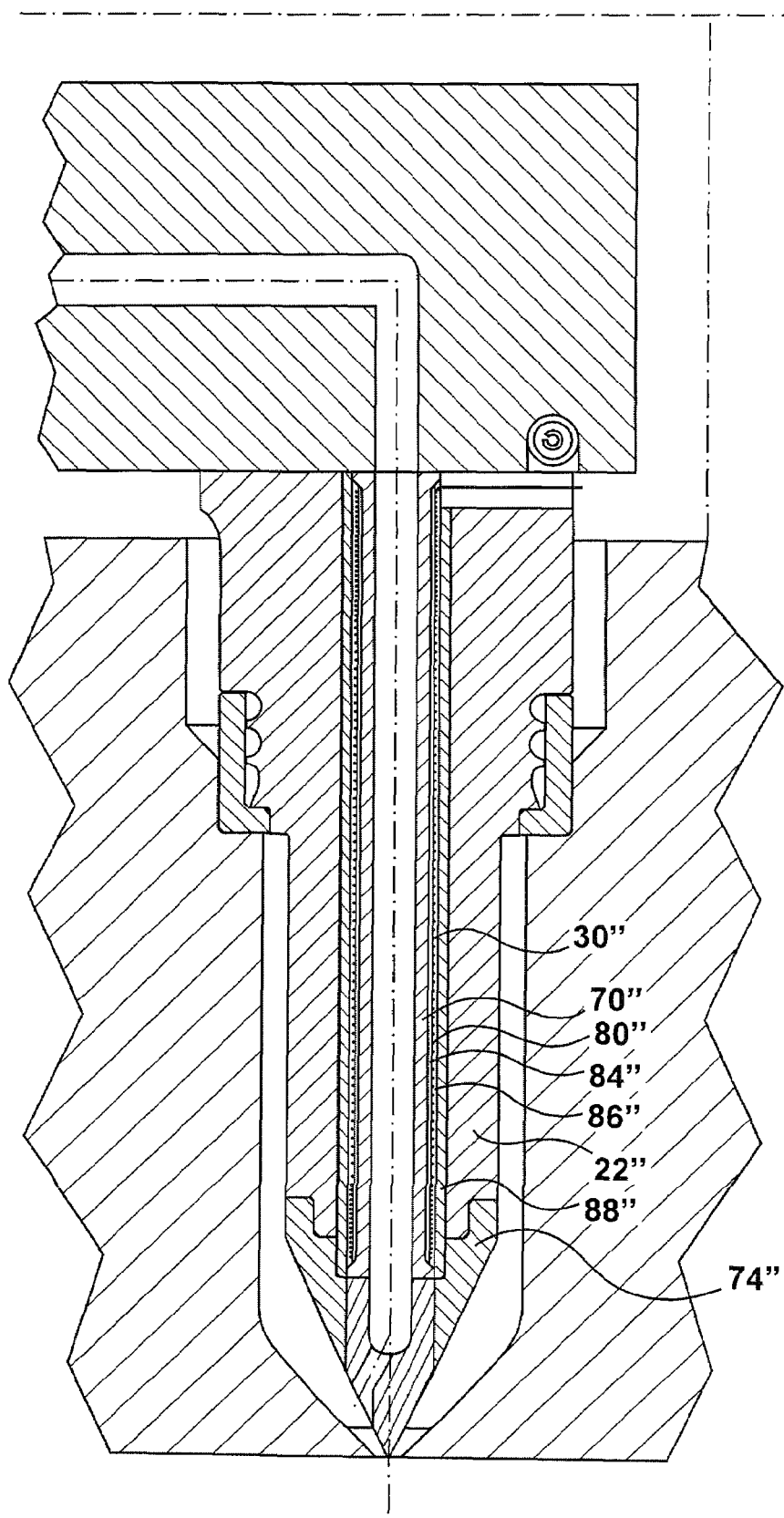
FIG. 10 is a sectional view of a further embodiment of the nozzle heater of the present invention.

Referring to FIG. 10, in an alternate nozzle embodiment, heater assembly 30" is disposed centrally within nozzle 22". Heater 30" has a core 70", first layer 84", wire element 80", second layer 86" and outer layer 88". A removable nozzle tip 74" is provided to permit heater assembly 30" to be removed from nozzle 22" for inspection, repair or replacement, as described above.

Figure 11:
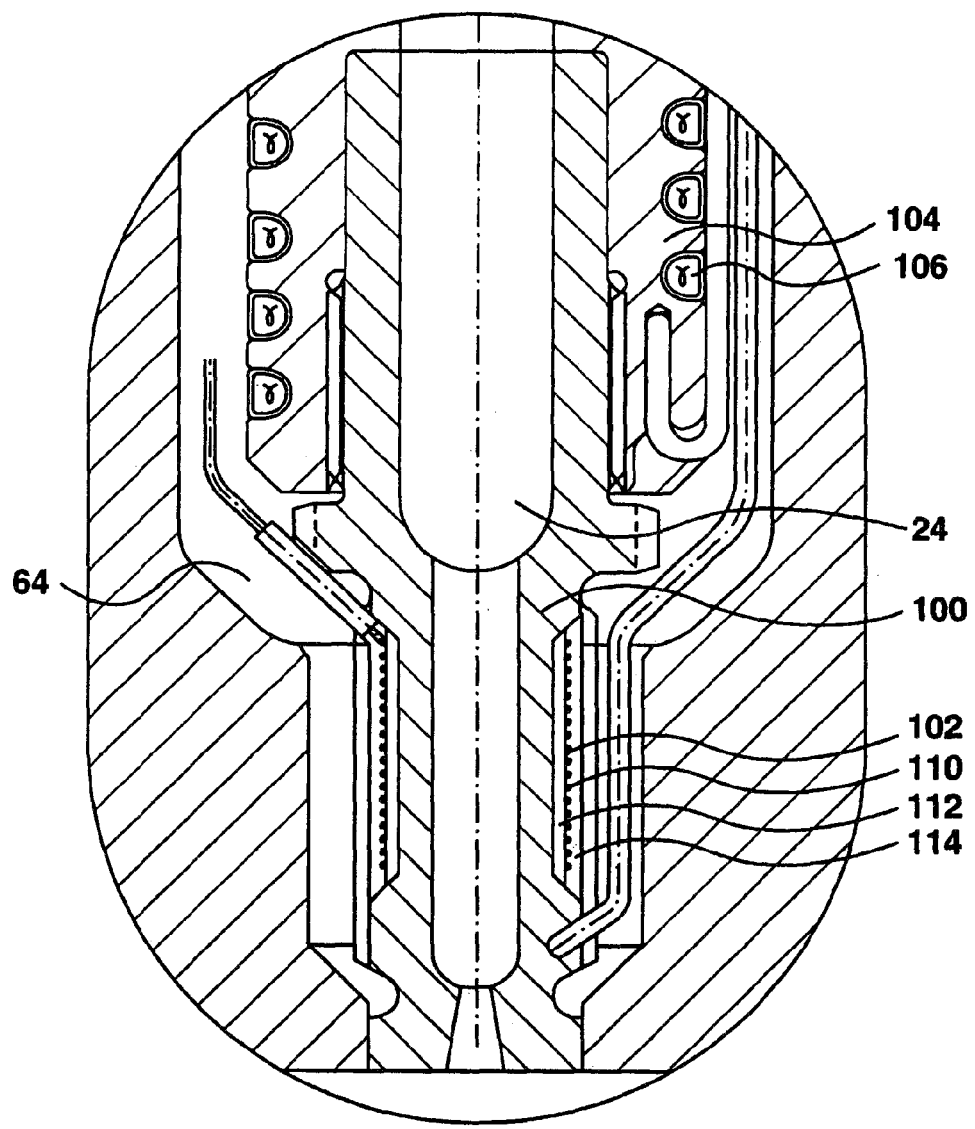
FIG. 11 is an enlarged sectional view of another nozzle embodiment employing a heater according to the present invention.

The present invention may be employed in any known injection molding nozzle design. Referring to FIG. 11, a two-part nozzle configuration according to the present invention is shown. A forward nozzle 100 has a heater assembly 102 according to the present invention, as described above, and a rearward nozzle 104 has a heater 106 according to the prior art, such as, for example, as is described in U.S. Pat. No. 5,051,086 to Gellert, incorporated herein by reference. Heater assembly 102 has a wire element 110, a first insulating layer 112 and second insulating layer 114, similar to that described above.

Figure 12A:
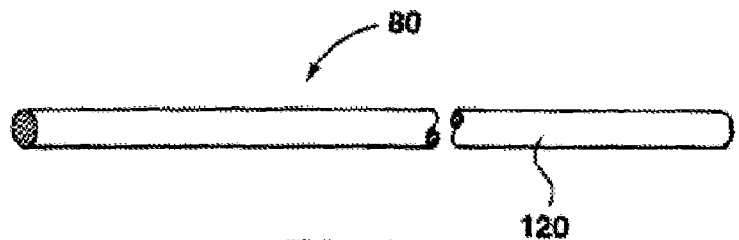
FIG. 12a is an isometric view of a straight wire element for use as a heater element of the present invention.
Figure 12B:
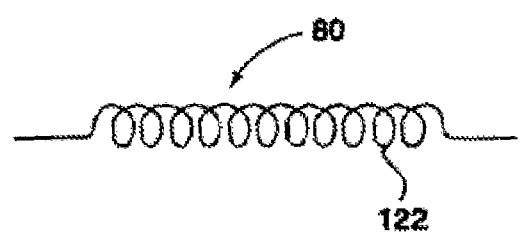
FIG. 12b is an isometric view of a coiled wire element for use as a heater element of the present invention.

It will be apparent to one skilled in the art that the present invention can be employed using a straight wire 120, as shown in FIG. 12a, as element 80 to be wound spirally around the nozzle body, as described above. Equally, however element 80 may be a coiled wire 122, as shown in FIG. 12b, spirally wound around the nozzle. "Coiled" in this application means helical or spring-like in nature, as illustrated in FIG. 12b. Coiled wire heating elements are well-known in the heating art as allowing for a reduction in heater power for a given operating temperature.

Figure 13A:
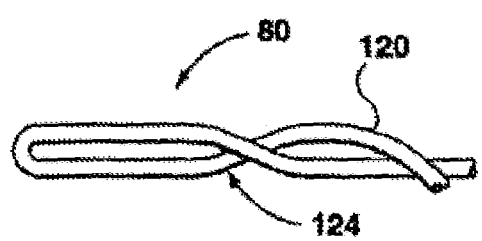
FIG. 13a is an isometric view of a doubled and twisted straight wire element for use as a heater element of the present invention.
Figure 13B:
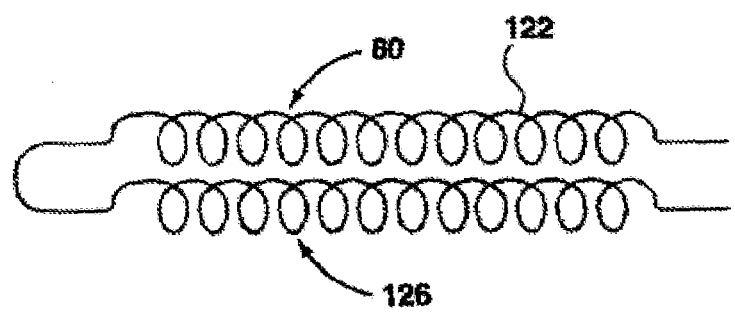
FIG. 13b is an isometric view of a doubled, coiled wire element for use as a heater element of the present invention.

Similarly, referring to FIG. 13a, it will be appreciated that the length of element 80 can be effectively doubled by folding over the wire element, and optionally twisted, to create a unitary element 124. Element 124, as expected, has twice the length of wire for a given element 80 length, and is twice as thick. Referring to FIG. 13b, a coiled and doubled element 126 can equally be provided.

Referring again to FIG. 3, in use wire element 80 is energized by a power source (not shown). As current flows through wire element 80, resistance to the electrical flow causes the wire to heat, as is well understood in the art. Heat generated by the element is preferably channelled and expelled substantially inwardly, by the presence first insulating layer 84 and second layer 86, to heat the pressurized melt in central melt bore 76. First layer 84 and second layer 86 also provide electrical insulation to electrically isolate wire element 80 from the surrounding metal components of the nozzle.

The uninsulated resistive wire heating element according to the present invention permits a cheaper heater to be obtained while permitting more exacting temperature distribution and control through more precise and flexible positioning of the element. Unlike the prior art, complex machining of the nozzle body and the need for integrally brazing the heating element to the nozzle body are removed, permitting savings in cost and time in fabricating the nozzle. Likewise, special and complex film printing techniques, materials and machinery are not required. Further, and perhaps most importantly, the present invention permits smaller diameter heated nozzle designs to be more easily achieved and more reliably operated than is possible with the prior art.

The heated nozzles of the present invention may be fabricated according to the method of the present invention. In a first embodiment of this method, steel nozzle body 68 is provided as the substrate for spraying first layer 84 thereon. First layer 84 may be provided by spraying, "painting" or otherwise coating in a thickness of between 0.1 mm and 0.5 mm. While greater thicknesses are possible, little benefit is attained by providing a thickness greater than 0.5 mm and, since it is generally desirable to minimize nozzle diameter, greater thicknesses are not typically preferred. First layer 84 is provided on outer surface 72 of nozzle body 68 so as to substantially cover, and preferably completely cover, outer surface 72 over the region where wire element 80 is to be located. After layer 84 is dry, wire element 80 is then positioned around first layer 84, preferably by winding wire element 80 spirally around the exterior of the nozzle. Although any wire pattern is possible, winding is typically preferred because, among other things, it requires the simplest operation in automated production. With wire element 80 around first layer 84, second layer 86 is then provided so as to substantially cover, and preferably completely cover, wire element 80 and thereby sandwich and encase wire element 80 between first layer 84 and second layer 86. Second layer 86 is preferably applied by spraying, "painting" or otherwise coating to a thickness of between 0.1 mm and 0.5 mm (for reasons described above), though any other method of applying second layer 86 may be employed, including providing a sleeve as described below. Once second layer 86 is dry, metal outer layer 88 is provided. Metal outer layer 88 may be applied in any known manner, such as by spraying or by shrink-fitting a sleeve, with spraying being preferred in this embodiment to minimize the overall diameter of the nozzle. With the outer layer applied, the assembly is then typically swaged to compact the assembly and bring the overall nozzle diameter to within desired dimensional tolerances.

This embodiment of the method permits smaller diameter and more durable nozzles to be obtained than is possible with the prior art. Further, the method is advantageous over the prior art since no additional heat treating step is required, thereby simplifying manufacture.

In an alternate embodiment of the method of the present invention, first layer 84 is provided as a pre-fabricated, self-supporting, substantially rigid, annular sleeve component which is telescopically, slidably positioned concentrically over core 70. The sleeve element may be cast, machined, molded or extruded into a thin-walled tube, and may be provided in any desired thickness, though thicknesses in the range of 1.5 mm to 2 mm are preferred to optimize thickness and durability of the sleeve component. The inside diameter of the first layer sleeve is preferably as small as possible while still permitting a sliding installation over core 70, so as to minimize any air space between the two components. The next step is to position wire element 80 around the first layer sleeve and, as one skilled in the art will understand, it is not important whether the wire element is positioned around the first layer sleeve prior or subsequent to the sleeve's installation on the nozzle body. In fact, an advantage of the method of this embodiment is that the wire element can be pre-wired on the first layer sleeve prior to installation, which can offer flexibility and simplification in manufacturing. Once wire element 80 has been provided around the first layer sleeve, second layer 86 is then applied to substantially cover, and preferably completely cover, wire element 80 so as to sandwich and encase wire element 80 between the first layer sleeve and second layer 86. Second layer 86 may be applied as a sleeve or by spraying, with the sleeve form being preferred in this embodiment. Again, it is not important whether second layer 86 is applied prior or subsequent to the installation of the first layer sleeve on the nozzle body. Second layer 86, if applied in sleeve format, is sized to fit as closely as possible over wire element 80 on the first layer sleeve to minimize the air space between the first and second layers. A metal outer layer 88 is then applied to the outside of second layer 86 and may be applied by any known means, such as by spraying or by shrink-fitting a sleeve, with shrink-fitting a sleeve being preferred in this embodiment. Again, as will be understood by one skilled in the art, if a second layer sleeve is used, the outer layer may be applied to the second layer sleeve either pre- or post-installation of the second layer sleeve on the first layer sleeve or the nozzle assembly. With the outer layer applied, the assembly is then typically swaged to compact the assembly and bring the overall nozzle diameter to within desired dimensional tolerances. The assembly is then finished as required. Such finishing steps may include providing removable nozzle tip 74 to the nozzle assembly, if necessary in the particular application.

This embodiment of the method permits a removable heater assembly to be achieved. The first layer sleeve and/or second layer sleeve can be selectively removed from the nozzle body for inspection and/or replacement, if the heater is damaged or worn, without the need to replace the entire nozzle. Further, the independent nature of the sleeve elements permits the order of assembly to be varied as necessary, for example, by allowing the wire element to be provided on the first layer sleeve prior to installation on the nozzle body. Similarly, the second layer may be provided on first sleeve, over the installed wire, prior to installation of the first layer sleeve on the nozzle body. This advantage offers not only flexibility in manufacture but also permits the wire element to be more precisely placed on the first layer sleeve. For example, laying the wire over the sleeve and then spinning the sleeve so as to wind the wire onto the sleeve permits a precisely controlled pitch and pitch variation. A further advantage of the method is that no additional heat treating step is required, thereby simplifying manufacture.

In will be understood in the previous embodiment that, if desired, wire element 80 can equally be pre-installed in the interior of a second layer sleeve, rather than the outside of first layer sleeve.

In both of the above embodiments of the method of the present invention, a metal surface layer 98 of copper or other highly thermally conductive metal may be applied with advantage to the nozzle body prior to providing the first insulating layer, as described above with respect to the apparatus. In one aspect, the surface layer is applied by spraying. In another aspect, the surface layer is provided by shrink-fitting a sleeve onto core 70 of nozzle body 68. As described above, the surface layer promotes thermal transfer between heater 30 and nozzle body 68.

While the above description constitutes the preferred embodiment, it will be appreciated that the present invention is susceptible to modification and change without parting from the fair meaning of the proper scope of the accompanying claims.

What is claimed is:

1. An injection molding apparatus comprising:
   an injection molding manifold heated by a manifold heater;
   a mold plate having a well where the mold plate is separated from the manifold by an air space;
   a mold gate communicating with a mold cavity;
   an injection nozzle seated in the well and located between the manifold and the mold gate, the injection nozzle having a nozzle body with a nozzle melt bore having a longitudinal axis;
   an electrical resistive heater fixed to the nozzle body, the heater having a wire element wrapped around and along the nozzle body from substantially one end of the nozzle body to another end of the nozzle body, the electrical resistive wire being electrically insulated from the nozzle body;
   a first thermocouple having a wire positioned along the nozzle body, the first thermocouple wire being electrically insulated from the nozzle body; and
   a second thermocouple having a wire positioned along the nozzle body, the second thermocouple wire being electrically insulated from the nozzle body, wherein the first and second thermocouples are fixed to the nozzle body and are disposed adjacent the electrical resistive heater to control the temperature of the nozzle provided by the electrical resistive heater.

2. The injection molding apparatus according to claim 1, wherein the heater wire element is coiled.

3. The injection molding apparatus according to claim 1, wherein the heater wire element is folded.

4. The injection molding apparatus according to claim 1, wherein the electrical resistive heater has successive windings that are closer together at at least one end of the nozzle.

5. The injection molding apparatus according to claim 1, wherein the first thermocouple is at a first distance from the longitudinal axis of the nozzle melt bore and the second thermocouple is at a second distance from the longitudinal axis of the nozzle melt bore and wherein the first distance is substantially equal to the second distance.

6. The injection molding apparatus according to claim 5, wherein the electrical resistive heater is at a third distance from the longitudinal axis of the melt channel and wherein the third distance is different from the first and second distances.

7. The injection molding apparatus according to claim 1, wherein the first thermocouple is positioned at a first location along the nozzle body and the second thermocouple is positioned at a second location along the nozzle body and wherein the first location and the second location are substantially at the same distance from the electrical resistive heater.

8. The injection molding apparatus according to claim 1, wherein the first and second thermocouples are disposed immediately adjacent to the electrical resistive heater.

9. A hot runner injection nozzle operable with an injection molding manifold, the nozzle comprising:
   a nozzle body, a nozzle head portion, a nozzle tip having a flow channel, a melt bore having a longitudinal axis along the nozzle body;
   an electrical resistive heater fixed to the nozzle body, the heater having a wire wrapped around and along the length of the nozzle body, the electrical resistive heater having successive windings that are closer together at an end of the nozzle, wherein the electrical resistive heater wire element is electrically insulated from the nozzle body;
   a first thermocouple fixed to the nozzle body, the first thermocouple having a wire positioned along the nozzle body, the first thermocouple wire being electrically insulated from the nozzle body; and
   a second thermocouple fixed to the nozzle body, the second thermocouple having a wire positioned along the nozzle body, the second thermocouple wire being electrically insulated from the nozzle body, wherein the first and second thermocouple are disposed adjacent a winding of the successive windings of the electrical resistive heater that are closer together to control the temperature at two adjacent locations on the nozzle.

10. The hot runner injection nozzle according to claim 9, wherein the first thermocouple is at a first distance from the longitudinal axis of the nozzle melt bore and the second thermocouple is at a second distance from the longitudinal axis of the nozzle melt bore and wherein the first distance is substantially equal to the second distance.

11. The hot runner injection nozzle according to claim 9, wherein the electrical resistive heater is at a third distance from the longitudinal axis of the melt channel and wherein the third distance is different from the first and second distances.

12. The hot runner injection nozzle according to claim 9, wherein the first thermocouple is positioned at a first location along the nozzle body and the second thermocouple is positioned at a second location along the nozzle body and wherein the first location and the second location are substantially at the same distance from the heater wire element.

13. A hot runner injection nozzle operable with an injection molding manifold, the nozzle comprising:
   a nozzle body, a nozzle head portion, a nozzle tip having a flow channel, a melt bore having a longitudinal axis along the nozzle body;
   an electrical resistive heater fixed to the nozzle body, the heater having a wire element wrapped around and along the nozzle body, the heater having successive windings that are closer together at an end of the nozzle, and wherein the electrical resistive wire element is electrically insulated from the nozzle body;
   a first thermocouple fixed to the nozzle body, the thermocouple having a wire positioned along the nozzle body, the first thermocouple wire being electrically insulated from the nozzle body; and
   a second thermocouple fixed to the nozzle body, the thermocouple having a wire positioned along the nozzle body, the second thermocouple wire being electrically insulated from the nozzle body, wherein the first and second thermocouple wires are disposed adjacent the heater and wherein the first and second thermocouple extend for substantially an entire length of the nozzle body defined between one end of the nozzle and the other end of the nozzle where the successive windings of the electrical resistive heater wire element are closer together.

14. The hot runner injection nozzle according to claim 13, wherein the first thermocouple is at a first distance from the longitudinal axis of the nozzle melt bore and the second thermocouple is at a second distance from the longitudinal axis of the nozzle melt bore and wherein the first distance is substantially equal to the second distance.

15. The hot runner injection nozzle according to claim 13, wherein the successive windings of the electrical resistive wire element that are closer together are located at the end of the nozzle proximate the nozzle tip.

16. An injection molding hot runner nozzle, comprising:
 a nozzle having a nozzle body and a melt bore therein for delivering melt to a mold cavity, the nozzle having a length defined between a first end near a manifold and a second end near a mold gate;
 a heating element fixed to the nozzle body and having an electrical resistive wire spirally wound around the nozzle, the wire being electrically insulated from the nozzle body, wherein the heating element traverses substantially the entire length of the nozzle to provide heat to the nozzle along the length of the nozzle;
 a first thermocouple having a wire electrically insulated from the nozzle body; and
 a second thermocouple having a wire electrically insulated from the nozzle body, wherein the first and second thermocouples traverse substantially the entire length of the nozzle.

17. The injection molding hot runner nozzle of claim 16, wherein the first and second thermocouple are adjacent to each other and are adjacent to the heating element.

18. The injection molding hot runner nozzle of claim 16, wherein the first and second thermocouple are located at substantially the same radial distance from the melt bore and are adjacent to the heating element.

19. The injection molding hot runner nozzle of claim 16, wherein the first and second thermocouples and the heating element are located at substantially the same radial distance from the melt bore.

20. The injection molding hot runner nozzle of claim 16, wherein the heating element is between the first and second thermocouples and the melt bore.

21. The injection molding hot runner nozzle of claim 16, wherein the wire heating element is coiled.

22. The injection molding hot runner nozzle of claim 16, wherein the wire heating element is folded.

23. The injection molding hot runner nozzle of claim 16, wherein the first and second thermocouples are integral to the nozzle.

* * * * *